W. DUNN.
HYDRAULIC TRANSMISSION MECHANISM.
APPLICATION FILED APR. 27, 1912.

1,055,619.

Patented Mar. 11, 1913.
7 SHEETS—SHEET 1.

Witnesses
Parker B. Martin
Leonard L. Swain.

Inventor
William Dunn
By Howard S. Smith,
His Attorney

W. DUNN.
HYDRAULIC TRANSMISSION MECHANISM.
APPLICATION FILED APR. 27, 1912.

1,055,619.

Patented Mar. 11, 1913.

Witnesses
Parker B. Martin
Leonard L. Swain

Inventor
William Dunn
By Howard S. Smith
His Attorney

W. DUNN.
HYDRAULIC TRANSMISSION MECHANISM.
APPLICATION FILED APR. 27, 1912.

1,055,619.

Patented Mar. 11, 1913.

Witnesses
Parker B. Martin
Leonard L. Swain

Inventor
William Dunn,
By Howard S. Smith
His Attorney

W. DUNN.
HYDRAULIC TRANSMISSION MECHANISM.
APPLICATION FILED APR. 27, 1912.

1,055,619.

Patented Mar. 11, 1913.

Witnesses
Parker B. Martin
Leonard L. Swain

Inventor
William Dunn,
By Howard A. Smith
His Attorney

W. DUNN.
HYDRAULIC TRANSMISSION MECHANISM.
APPLICATION FILED APR. 27, 1912.

1,055,619.

Patented Mar. 11, 1913.

W. DUNN.
HYDRAULIC TRANSMISSION MECHANISM.
APPLICATION FILED APR. 27, 1912.

1,055,619.

Patented Mar. 11, 1913.

Witnesses
Parker B Martin
Leonard L. Swain.

Inventor
William Dunn,
By Howard S. Smith,
His Attorney

W. DUNN.
HYDRAULIC TRANSMISSION MECHANISM.
APPLICATION FILED APR. 27, 1912.

1,055,619.  Patented Mar. 11, 1913.
7 SHEETS—SHEET 7.

Witnesses
Parker B. Martin
Leonard L. Swain

Inventor
William Dunn

By Howard S. Smith,
His Attorney

UNITED STATES PATENT OFFICE.

WILLIAM DUNN, OF BANNOCK, MONTANA.

HYDRAULIC TRANSMISSION MECHANISM.

1,055,619.  Specification of Letters Patent.  Patented Mar. 11, 1913.

Application filed April 27, 1912. Serial No. 693,603.

*To all whom it may concern:*

Be it known that I, WILLIAM DUNN, a citizen of the United States, residing at Bannock, in the county of Beaver Head and State of Montana, have invented new and useful Improvements in Hydraulic Transmission Mechanism, of which the following is a specification.

This invention relates to new and useful improvements in hydraulic transmission mechanism.

My present invention is designed primarily for automobiles, but it may be used as an air compressor or pump by making certain modifications or alterations therein.

The principal object of my invention is to provide hydraulic means for transmitting power from the motor to the driving axle of an automobile. The gearing and other mechanism commonly employed for this purpose is attended with many difficulties which my invention is designed to overcome. For example, a transmission system which employs gears is not conducive to a large number of change speed positions owing to the complexity of the mechanism required and the prohibitive cost of construction. There is also a constant loss of power due to slippage of the friction clutches commonly employed in gear systems of transmission. And a great loss of momentum also results when the clutch is disengaged to shift the gears when climbing a hill, or when changing from a low to a high speed position on a level surface.

My invention is designed to overcome the above difficulties as well as others which exist in a system comprising friction elements and gears for transmitting power. I employ a fluid, preferably oil, as a transmitting medium, to which motion is imparted by my new form of rotary pump hereinafter to be described, and which communicates said motion to my new form of motor and differential also to be described.

My invention provides for a wide range of speeds, with full engine power at all speeds. It will also perform the function of a clutch and brake.

Another distinct advantage to be obtained by my new hydraulic transmission system is, that the controlling means for the change speed mechanism, the throttle, spark control and steering wheel are all brought together in a position immediately in front of the driver.

With the above and other incidental objects in view, my invention consists in the certain novel construction and arrangement of parts to be hereinafter described in the following specification and particularly pointed out in the subjoined claims.

In the accompanying drawings.

Throughout the specification and drawings, similar reference characters denote corresponding parts.

Figure 5:
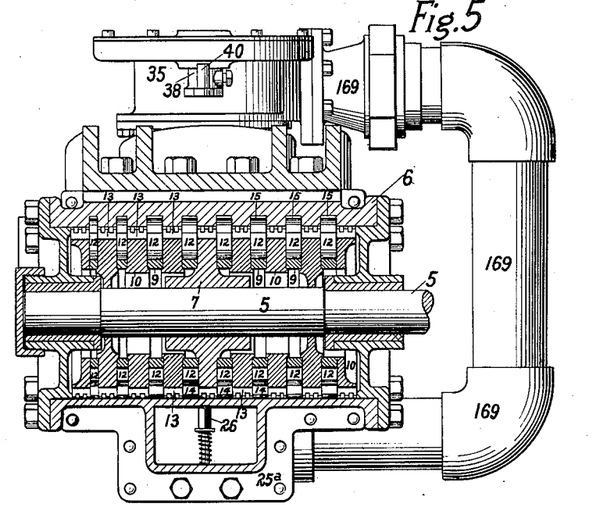
Fig. 5 is a section on the line $b$—$b$ of Fig. 3, showing in detail the rotary pump mechanism.
Figure 6:
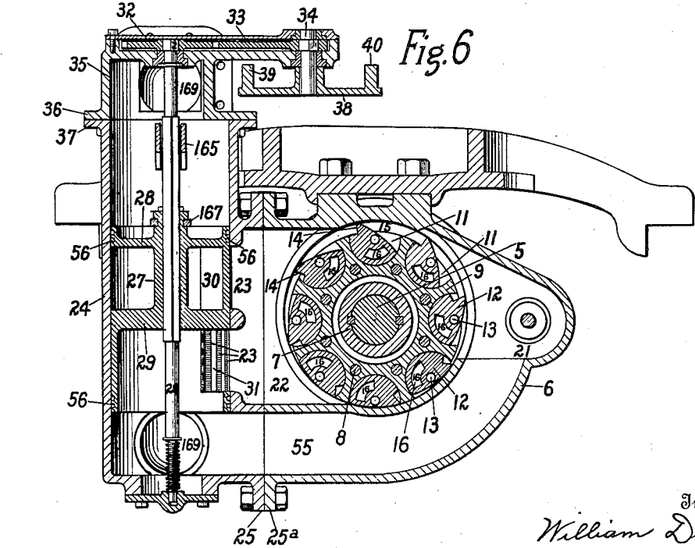
Fig. 6 is a section on the line $c$—$c$ of Fig. 3, showing the rotary pump mechanism and control valve for the motive fluid.

In a detailed description of my invention, 1 designates an automobile mounted upon the usual front dirigible wheels 2 and rear driving wheels 3. Suitably supported by the main frame of the car is an engine 4, preferably of the internal combustion type, having a driving shaft 5 which enters a pump casing 6. Mounted on the driving shaft 5, in the casing 6, is a web 7 from which extends, in both directions, a series of bolts 8 which support a plurality of circular plates or spiders 9. While I have shown eight of these plates or spiders, any number may be employed. These spiders are spaced apart sufficiently to provide room between them for circular supporting plates 10, through which the bolts 8 also pass, see Figs. 5, 6 and 8. Each of the spiders 9 is circular, and has formed in its outer periphery a plurality of semi-circular recesses 11 in which turn oscillating segments 12 loosely mounted on pivots 13 secured to the supporting plates 10. Each segment 12 has a notched end 14 adapted to engage the curved surface of an eccentric bore 15, one for each spider, provided in the casing 6. When the shaft 5 is rotated by the engine 4, the supporting plates 10 are likewise rotated, and when so moved, the segments 12 carried by them are turned by centrifugal force to bring their notched ends 14 into continuous engagement with the surfaces of their respective bores 15. The bores 15 have sufficient eccentricity to keep the segments 12 wholly within the recesses 11 of their respective spiders, which is their normal position, gradually permitting them to be swung outwardly by centrifugal force until the point is reached in their travel where the eccentricity of the bores decreases, when the segments are gradually forced back into their normal positions in said recesses 11. In order that they may be moved by the action of centrifugal force, these segments have openings 16 therein to make them heavier on one side than on the other.

Mounted beneath the rear seat 17, or in any other suitable part of the automobile, is a fluid storage reservoir 18, which communicates, by means of a standard pipe connection 19, with a conduit 20. While any motive fluid may be used in my transmission mechanism, I employ oil because of its density, and non-freezing and lubricating properties. The conduit 20 communicates directly with an inlet chamber 21 of the pump casing 6, whereby fluid from the reservoir 18 may be delivered by gravity to the rotor mechanism just described. The segments 12 start to swing outwardly near the point where they come in contact with the fluid in the inlet chamber 21. Therefore, the fluid is trapped between the segments 12, spiders 9 and shell of the casing 6, as centrifugal force swings said segments outwardly against the increasing eccentricity of the bores 15 formed in said casing. As the eccentricity of the bores decreases, the segments are gradually swung back to their normal positions in the recesses 11 of their respective spiders. At the point where the segments assume their normal positions, the bores coincide with the cylindrical surface of the spiders, thus preventing any fluid passing beyond that point and returning to the inlet chamber 21. Therefore, the only outlet for the fluid is a plurality of ports 22 provided in the casing 6, said ports being rectangular in cross-section and corresponding in number to the spiders 9. These ports 22 communicate with a corresponding number of fluid ports 23 in a vertically disposed cylindrical valve housing 24 provided with a flange 25 which is bolted to a similar flange 25ª on the casing 6, whereby said pump casing and valve housing are connected to each other.

Suitably journaled in the housing 24 is a shaft 26, the central portion of which is square. Loosely mounted on the square portion of the shaft 26, so as to turn with the shaft and be longitudinally movable thereon, is a rotary valve 27. The valve 27 is a hollow cylindrical casting sealed at the top and in the center by webs 28 and 29 respectively, see Fig. 9. All of the cylindrical wall in the upper half of the valve 27 is cut away with the exception of a portion 30 of sufficient size to cover the upper portions of all the ports 23. The cylindrical wall of the lower half of the valve 27 is cut away sufficiently to provide an opening 31 therein corresponding in size to the retained portion 30 of the upper half of said valve. The valve 27 is so constructed that when the upper portions of all the ports 23 are sealed by the retained portion 30 of the valve 27, the lower portions of all of said ports are open to the lower half of the valve through the opening 31. As the valve 27 is rotated to cause the retained portion 30 thereof to uncover the upper portions of one or more ports 23, the lower half of the valve is brought to a position to close the lower portions of said selected ports whereby they are cut off from communication with the opening 31 therein. However, all the remaining ports 23 not uncovered by the retained portion 30 of the upper half of the valve 27, will be in communication with the said opening 31 in the lower half of the valve to bypass the fluid therethrough.

The valve 27 is rotated as follows: The shaft 26 carries on its upper end a gear 32 which meshes with a toothed sector 33 fast on a shaft 34 suitably journaled in a gear casing 35. This casing 35 also acts as a cover for the valve housing 24, being secured thereto by a flange 36 which is bolted to a similar flange 37 on the said housing. Carried by the other end of the shaft 34 is a double rocker arm 38 carrying pins 39 and 40 on each end thereof, respectively. The pin 39 moves in a longitudinal slot 41 provided in one end of a rod 42, which is connected to an arm 43 of a countershaft 44. The other pin 40 moves in a longitudinal slot 45 provided in one end of a rod 46 similar to the rod 42, and which is connected to an arm 47 on the said countershaft. This countershaft is rotated by a rocker arm 48 fast thereon, which is connected by a rod 49 to a rocker arm 50 fast on a shaft 51 suitably journaled for rotation in a steering post 52 supported in the body of the car. Attached to the upper end of the shaft 51 is a lever 53 which moves over a notched sector 54, to control the speed of the car in its forward or reverse movement. When the lever 53 is moved counter-clockwise from its neutral or central position, the countershaft 44 will be rotated to move the rod 42 forwardly until the pin 39 rests in the extreme end of the slot 41, whereupon said pin will be moved to rotate the valve 27 through the intermediate gearing described, a distance sufficient to uncover the number of ports 23 which correspond to the forward speed desired. The rod 46 will also be moved forwardly by the countershaft 44, but not a sufficient distance to permit the end of the slot 45 to engage the pin 40, see Figs. 15 and 16.

The valve 27 may be rotated by the mechanism hereinbefore described to cause the retained portion 30 thereof to uncover the upper portions of any number of ports 23. If the upper portion of one port is uncovered thereby, the rotation of the shaft 5 will cause the fluid trapped between the segments 12 movable in the bore 15 corresponding to that particular port, to force said fluid, through intermediate passages, to the rear motor hereinafter to be described. If two ports are uncovered by the said portion 30, the sets of segments turning in the two bores 15 corresponding thereto, will force the fluid trapped between them to the said rear motor, and so on until the upper portions of all the ports 23 are uncovered, when all the fluid will be forced rearwardly and none bypassed through the opening 31 in the lower half of the valve. And in order to further proportion the amount of oil forced through the ports 23 by the rotary pump heretofore described, the retained portion 30 of the upper half of the valve 27 may be so positioned by rotating said valve, to uncover but a fractional part of the upper portion of a port 23, or the upper portions of several of said ports completely and a fractional part of another. It will thus be seen that the number of changes in speed to be secured by proportioning the flow of fluid to the rear motor, is almost unlimited. And in order to secure a very minute flow of fluid through any one of the said ports, the particular set of segments, spider and bore provided for said port may be made very narrow. For example, I have shown the two left-hand bores 15, spiders 9 and segments 12 as being much narrower than the rest for the above reason. In order to relieve the fluid pressure on those segments which are not supplying fluid to the rear motor, the fluid is bypassed through the opening 31 in the lower half of the valve 27. For instance, if the upper portion of one of the ports 23 is uncovered by the retained portion 30 of said valve 27, the opening 31 in the lower half of the valve will be brought into a position to receive the fluid from all the ports 23 except the one whose upper portion is uncovered by the said retained portion 30. Accordingly, all the fluid except that forced to the rear motor through the upper portion of the valve 27, will enter the lower half of the valve through the opening 31, and from thence pass through a conduit 55 to the inlet chamber 21, which cycle may be continuous.

The rotary valve 27 is provided with annular recesses 56 to receive cylinder rings which are adapted to press against the periphery of the housing 24 to prevent leakage of the motive fluid beyond the said valve.

Figure 2:
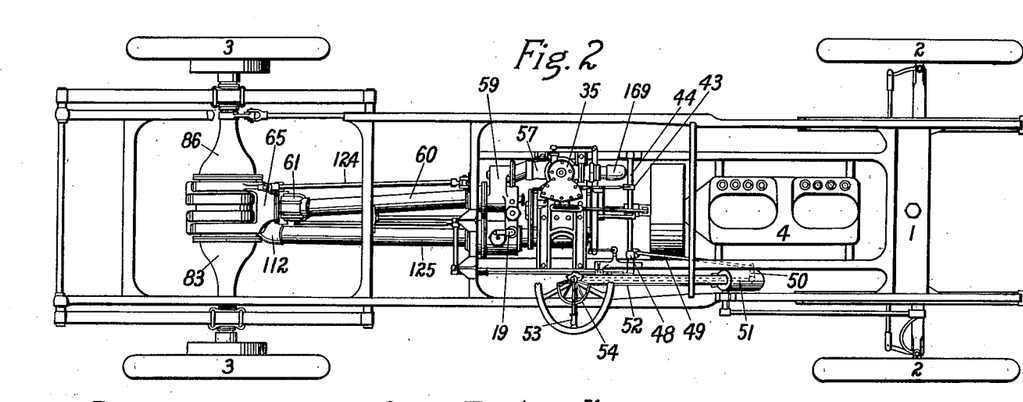
Fig. 2 is a top plan view of the same.
Figure 3:
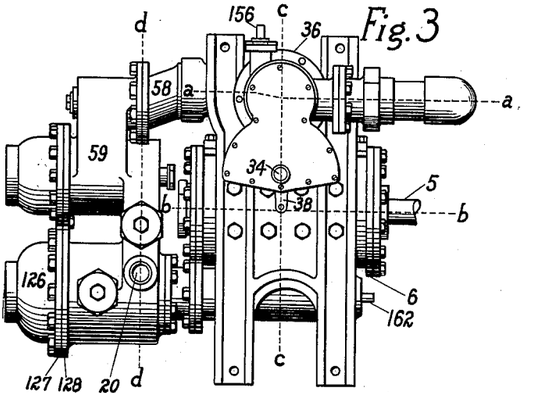
Fig. 3 is a top plan view of the rotary pump and connections.

The upper half of the valve 27 is at all times in communication with an outlet conduit 57, except when said valve is used as a clutch, such use to be hereinafter referred to. The fluid forced through the upper half of said valve 27, passes into the conduit 57, and thence through an offset pipe connection 58, valve housing 59, and flexible pipe 60, to a reversing valve casing 61, see Figs. 2, 8 and 11. The valve casing 61 comprises a casting having two curved and two flat sides. One end 62 thereof is internally screw-threaded for connection with the flexible pipe 60, while the other end is provided with a flange 63 to which is bolted a similar flange 64 of the motor casing 65. Suitably journaled in the flat sides of the valve casing 61, is a shaft 66 carrying two rocker arms 67. These arms 67 are located within the casing 61, and are notched at their lower ends to receive pins 68 of a slide valve 69 adapted to cover and uncover ports provided in the motor casing 65, to be hereinafter described, see Figs. 10, 11, 13 and 14.

One of the flat sides of the valve casing 61 has a screw-threaded opening which receives a screw-threaded cap 70, carrying a bearing 71, and also providing a recess for a compression spring 72. The opposite flat side of the casing 61 is also provided with an opening adapted to receive a bushing 73 which forms a bearing for the other end of the shaft 66, and also provides a seat for a conical member 74 carried by said shaft. The spring 72 normally exerts pressure against the shaft 66 in the direction of its length, to hold the conical member 74 tightly on its seat to prevent the leakage of fluid from the casing 61. While I employ this form of device to prevent the leakage of the fluid through the bearings of this and many other shafts used in my invention, any other equivalent means capable of performing the same function, may be used.

The rear motor casing 65 consists of a casting containing a cylindrical bore divided into two equal sections by a web 75. This web carries a bearing 76 for the rear axle of the automobile, said axle being divided into two equal sections 77 and 78. The casing 65 is closed at its ends by end plates 79 and 80 respectively. The end plate 79 carries a suitable bearing 81 for the axle section or shaft 77, and the plate 80 carries a bearing 82 for the axle section or shaft 78. The end plate 79 is held in place by an axle housing 83 having a flange 84 which is bolted to a similar flange 85 of the casing 65. And the end plate 80 is held in place by an axle housing 86 having a flange 87 which is secured to a similar flange 88 of the casing 65, see Figs. 10 and 11.

Figures 10, 11, 12:
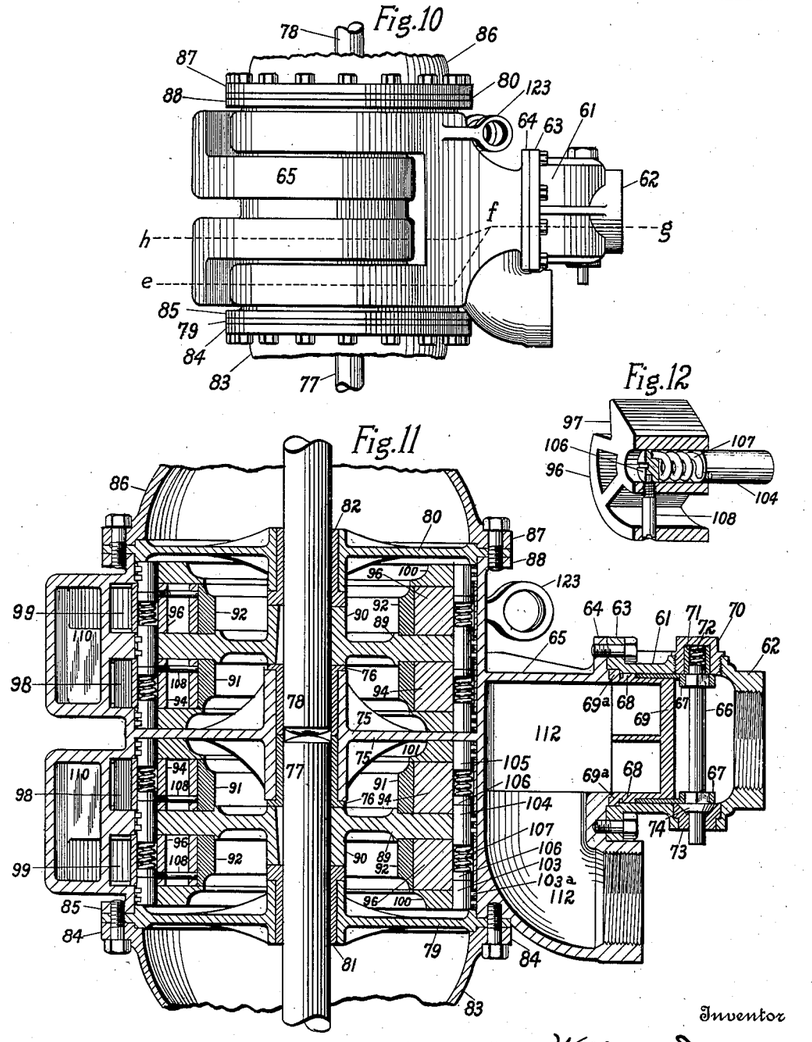
Fig. 10 is a top plan view of the housing containing the rear motor, and connections.
Fig. 11 is a sectional plan view of the same.
Fig. 12 is a detail view of one of the spring-actuated segments of the rear motor.
Figure 13:
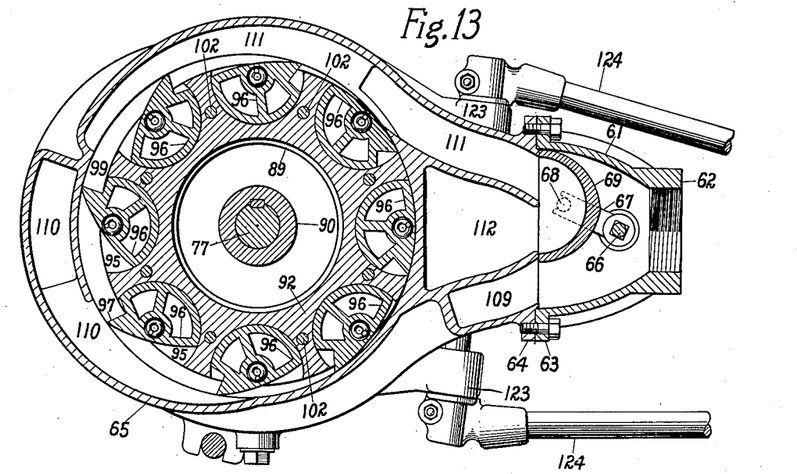
Fig. 13 is a section on the line $e$—$f$—$g$ of Fig. 10, showing one reversing rotor of the rear motor, and the reversing valve.

Referring to Fig. 11, 89 designates a circular supporting plate carried by a hub 90 fast on the shaft 77. Mounted on one side of the plate 89 is a circular plate or spider 91, and on the other side of said plate is mounted a similar spider 92. The spider 91 has formed in its outer periphery any number of semi-circular recesses 93 in which oscillate segments 94, see Fig. 14. Oscillating in a like number of semi-circular recesses 95 formed in the periphery of the spider 92, are segments 96 which are similar to the segments 94, see Fig. 13. Each of the segments 94 and 96 has a notched end 97 adapted to engage eccentric bores 98 and 99 respectively of the motor casing 65. Located adjacent the outer surface of the spider 92 is an end ring 100, a similar ring 101 being located between the spider 91 and web 75. Supporting bolts 102 pass through the ring 101, spider 91, plate 89, spider 92 and ring 100, whereby all of these elements are firmly clamped together for rotation in unison.

Carried by the ring 100, supporting plate 89 and ring 101, are pivots 103, 104 and 105 for the oscillating segments 94 and 96. The segments 96 of the spider 92 are loosely mounted on the pivots 103 and 104; while the segments 94 of the spider 91 are loosely mounted on the pivots 104 and 105. Each of the rings 100 and 101, and plate 89, is provided with annular recesses 103ᵃ to receive cylinder rings to prevent leakage of the fluid from the bores 98 and 99.

Each of the segments 94 and 96 is constructed as follows: For example, located between the pivots 103 and 104, in the bore of each of the segments 96 mounted thereon, is a disk 106 and helical spring 107, see Fig. 12. One end of the spring 107 is secured to the pivot 104 and the other end to the disk 106. The disk 106 has a longitudinal slot in its outer periphery adapted to receive a pin 108 carried by the oscillating segment 96. Accordingly, when the disk 106 is rotated by a screw driver or other means, the spring 107 will be twisted, and when a sufficient torque has been secured, the disk 106 can be locked to the segment 96 by the pin 108. The pivots 103 and 104 are stationary in the rings and plate, while the disk 106, when pinned to the segment 96, will rotate with the latter. Therefore, the notched end 97 of the said segment will be forced, by the helical spring 107, into continuous engagement with the curved surface of its respective eccentric bore 98 of the motor casing 65. As a similar disk and spring construction is employed for forcing the notched ends 97 of the segments 94 into engagement with the curved surface of their respective bore 99, a description of the same is deemed unnecessary, except to say that the segments 94 have a position on their pivots 104 and 105 just the reverse of that of the segments 96.

A spring is employed in connection with the rear motor segments for the reason that they are the means acted upon to rotate the rear axle of the car, in which case centrifugal force would not be effective to move them from a zero position.

Mounted on the shaft 78 is a rotor mechanism which is similar in all respects to that carried by the shaft 77. Therefore, the reference numerals applied thereto on the drawings, are the same as those borne by corresponding parts of the rotor mechanism carried by the shaft 77.

Figure 14:
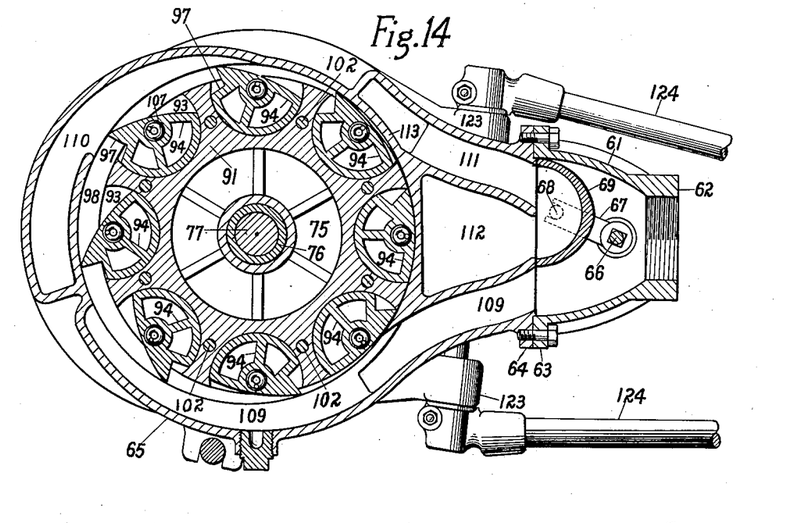
Fig. 14 is a section on the line $h$—$f$—$g$ of Fig. 10, showing one forward driving rotor of the rear motor and the reversing valve.

Provided in the rear motor casing 65 is a port 109 through which the fluid is delivered from the valve casing 61, in equal quantities, to the segments 94 of each of the spiders 91, which are the spiders located nearest the web 75. As shown in Fig. 14, the slide valve 69 is in a position to direct the fluid into the port 109, which in turn conducts it rearwardly to the segments 94. At the point where the fluid is delivered to said segments, the eccentricity of the bores 98 is such as to permit the springs 107 to force the segments 94 into a position in which a portion of their surfaces will be exposed to the motive fluid. The fluid acts upon the segments to rotate the supporting plates 89, and through them the axle sections 77 and 78 to drive the car in a forward direction. As the plates 89 and spiders 91 are rotated, the segments 94 will continue to present a larger surface to the fluid until the point is reached in their travel where the decreasing eccentricity of the bores 98 will move said segments back to their normal positions in the recesses 93 of their respective spiders 91. As said segments are swung back to their normal positions, the fluid which was trapped between them is permitted to escape into channels 110. These channels conduct the fluid to the two bores 99, which are the two outermost bores, where said fluid is picked up by the segments 96 movable in the spiders 92. These segments 96 have a position in their recesses 95, just the reverse of that of the segments 94 in their respective recesses 93. All four sets of segments rotate in the same direction, and when the two inner sets are acting as a motor, the two outer sets act as a pump to return the fluid to its starting position as follows: The eccentricity of the bores 99 is such as to permit the springs 107 to swing the notched ends 97 of the segments 96 outwardly, whereupon the fluid from the channels 110 will be trapped between the segments until the point is reached in their travel where the decreasing eccentricity of the bores 99 forces them back to their normal positions in the recesses 95. The fluid having no other means of escape, is forced into a port 111 which communicates with the valve casing 61. In the present case, however, the slide valve 69 is positioned to prevent the fluid entering the said valve casing, but directs it to an outlet pipe 112 to be hereinafter referred to.

The ports 109 and 111 have the form of an oblong square in cross section. The said port 111 is sealed from communication with the bores 98, by walls 113. These walls are provided to prevent the fluid being delivered to the two inner sets of segments 94 from different directions and thereby producing counteracting forces.

It will now be seen that the fluid forced into the valve casing 61 by the rotary pump mechanism hereinbefore described, is delivered through the port 109, when uncovered by the valve 69, to the two middle bores 98, where it comes in contact with the exposed portions of the segments 94 to rotate the shafts 77 and 78 in a forward direction. When the said segments are gradually forced back to their normal positions, the fluid enters the channels 110 which carry it to the two outer bores 99, where it is received by the two sets of segments 96. These segments act as a pump to force said fluid into the port 111, which carries it to the outlet pipe 112.

The mechanism just described is admirably adapted for use as a differential to provide for the different rates of speed of the driving wheels 3, due to the automobile turning a corner or any other cause. As has been stated, the rear axle of the automobile is divided into two sections, viz., 77 and 78, the inner ends of which are journaled in the bearing 76 carried by the web 75. When one rear wheel 3 rotates at a slower speed than the other, the spider 91 secured to the supporting plate 89 of the axle section 77 on which said wheel is mounted, will rotate at a slower rate of speed than the corresponding spider 91 secured to the supporting plate 89 of the other axle section 78. Accordingly, while a less quantity of motive fluid will be received by the segments 94 of the first named spider, a greater quantity of fluid will be delivered to the segments 94 of the corresponding spider 91, which will rotate the axle section 78 at a greater rate of speed to compensate for the reduction in speed of the other axle section 77.

Figure 1:
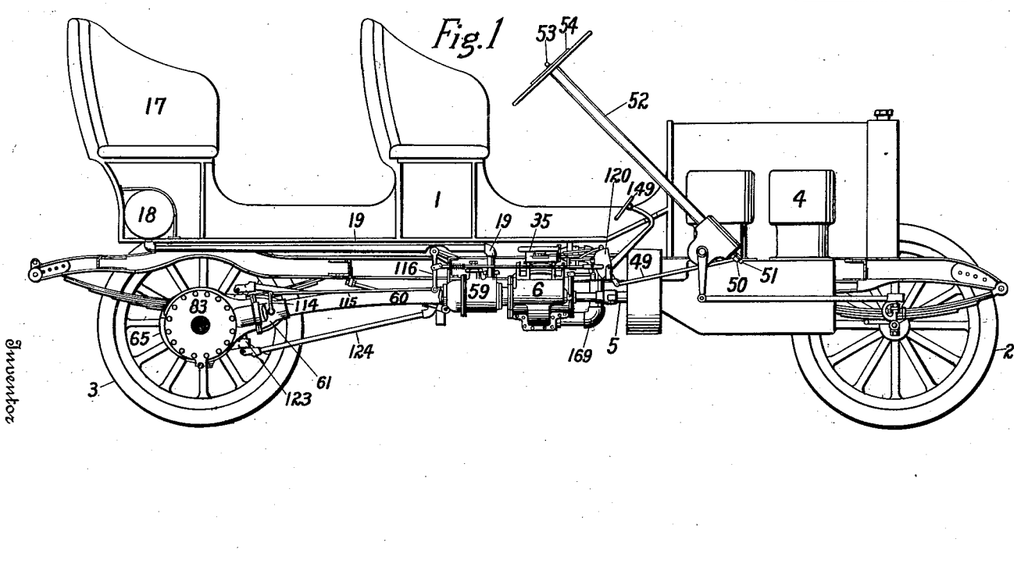
Figure 1 is a side elevation of an automobile showing my new form of hydraulic transmission mechanism applied thereto.

The car is reversed as follows: The shaft 66 which communicates motion to the slide valve 69, carries a rocker arm 114 which is connected, by means of a rod 115, to a rocker arm 116 carried by a shaft 117 journaled in the main frame of the automobile, see Figs. 1 and 2. This shaft 117 carries on its other end a rocker arm 118, which is operated by a rod 119, which is in turn operated by a cam 120 as follows: The cam 120 is mounted on the shaft 44, which shaft is adapted to be rocked, through mechanism hereinbefore described, by the hand lever 53. Adapted to engage the periphery of the cam 120 is a roller 121 pivoted to the rod 119. The periphery of the cam 120 is so curved that when the lever 53 is moved counter-clockwise from its neutral position to obtain a forward speed, said cam will not move the roller 121. But the curvature of the periphery of the cam 120 is such that when the lever 53 is moved clockwise from its neutral position, the roller will be engaged by the cam 120 to move the rod 119 rearwardly to rock the arm 118, shaft 117 and rocker arm 116, to move the rod 115 rearwardly, see Figs. 15 and 16. The rod 115 will then rock the arm 114 to rotate the shaft 66, which, through the arms 67, shifts the valve 69 to uncover the port 111 and connect the port 109 with the outlet pipe 112. A spring 122 is provided for the purpose of returning the rod 119 to its normal position when the lever 53 is moved from the reverse to the neutral position.

When the slide valve 69 is moved to a position to uncover the port 111, by the mechanism hereinbefore described, the fluid forced into the valve casing 61 by the rotary pump, will enter the port 111 to be delivered thereby to the two outer bores 99. The fluid will then come in contact with the two outer sets of segments 96 of the spiders 92, to rotate the supporting plates 89 to which the said spiders are secured, and the segments pivoted, and through them rotate the shafts 77 and 78 to drive the car in a reverse direction. The segments 96 will continue to present a larger surface to the incoming fluid until the point is reached in their travel where the decreasing eccentricity of the bores 99 starts to force said segments back to their normal positions in the recesses 95. The fluid then escapes through the channels 110 to the bores 98, where it is received by the two middle sets of segments 94 and pumped by them into the port 109 by which it is conveyed to the outlet pipe 112. It will now be seen that by shifting the slide valve 69 to a position to uncover the port 111 and connect the port 109 with the outlet pipe 112, the automobile may be reversed.

To prevent the rear motor casing 65 from revolving, due to the reaction of the fluid upon the oscillating segments carried by the driving mechanisms of the shafts 77 and 78, the casing 65 is provided with brackets 123 to which are connected torque rods 124 anchored to the automobile frame in front of said motor casing.

Figure 7:
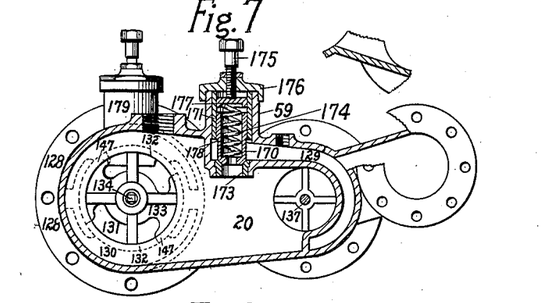
Fig. 7 is a section on the line $d$—$d$ of Fig. 3, showing the brake mechanism and safety valves.
Figures 8, 9:
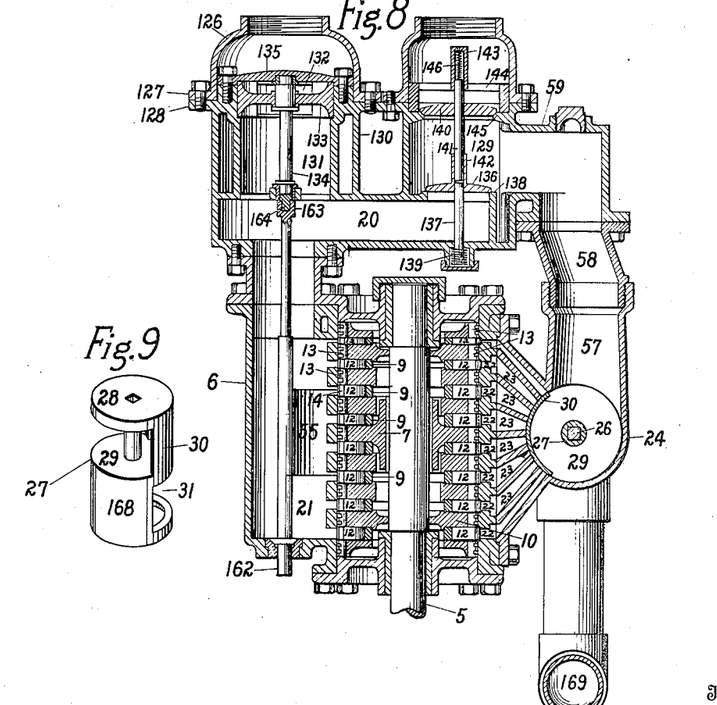
Fig. 8 is a plan view of the rotary pump, control valve and brake mechanism.
Fig. 9 is a detail view of the rotary control valve.

The fluid pumped into the outlet pipe 112, passes therethrough into a flexible pipe 125 which is connected to a reducing coupling 126. Referring to Fig. 8, the reducing coupling 126 is provided with a flange 127 which is bolted to a similar flange 128 of the valve housing 59. The valve housing 59 comprises two cylindrical chambers 129 and 130. Within and concentric with the chamber 130 is a chamber 131. The two latter chambers communicate with each other through openings 132, which may be closed wholly or partially by a rotary brake valve 133. This valve is mounted on a shaft 134, one end of which is journaled in a cover plate 135 secured to the internal casing 131, completely sealing one end thereof. The internal chamber 131 communicates with the cylindrical chamber 129 through the conduit 20, which is normally closed by a check valve 136 supported by a stem 137. The valve 136 is normally held on its seat 138 by a compression spring 139 mounted on the end of the stem 137, see Figs. 7 and 8. Immediately above the check valve 136 is located a check valve 140 mounted on a stem 141 longitudinally movable in a guide 142 provided in the check valve 136. The other end of the stem 141 extends into a tubular portion 143 of an apertured cover plate 144 supported in the upper portion of the cylindrical chamber 129. This apertured plate 144 allows a free passage of fluid therethrough at all times. The check valve 140 is normally held on its seat 145 by a spring 146 mounted in the tubular portion 143. The fluid flowing into the cylindrical chamber 130 from the reducing coupling 126, must pass through the openings 132 in the walls of the cylindrical chamber 131, in order to enter said chamber. The brake valve 133 mounted in said chamber 131, comprises two quadrants 147, which may be rotated to completely or partially cover the openings 132, thus checking the flow of fluid from the rear motor, and in doing so performing the function of a brake.

In order that the slide valve 69 may withstand the force of the fluid pumped against it when the brake valve 133 is actuated to retard the motion of the rear motor, said valve, on its flat sides, near its outer edges, is provided with extensions 69$^a$ which slide into recesses provided in the valve casing 61.

This construction prevents the slide valve 69 being moved from its seat by the pressure of the fluid forced against it.

The brake valve 133 is rotated through the following mechanism: Mounted on the shaft 44, and free to revolve independently of it, is a sleeve 148. This sleeve 148 is rocked by a foot pedal 149, which projects through the floor of the automobile at a convenient point in front of the driver. Mounted on the sleeve 148 is a rocker arm 150 which is connected to an offset link 151, which carries a fulcrum 152 for a lever 153. One end of the lever 153 has connected thereto a link 154 which operates a rocker arm 155. This arm 155 rocks a shaft 156 passing into the gear casing 35, to lift the contral valve 27 through mechanism hereinafter to be described. The opposite end of the lever 153 is connected by a link 157 to one end of a bell crank 158. The lever 153 also carries a spring 157$^a$ at the point of attachment of the link 157. The bell crank 158 is pivoted in a bracket 159 supported by the main frame of the automobile. The opposite end of the bell crank 158 is connected to a link 160, which in turn connects it to a rocker arm 161, see Figs. 15 and 16. The rocker arm 161 is mounted on a shaft 162 which passes into the inlet chamber 21 of the casing 6, see Fig. 8. This shaft 162 extends through the inlet chamber 21 into the valve housing 59, and terminates in an enlarged portion 163 containing a square socket which receives a square end portion 164 of the shaft 134. Accordingly, the rotation of the shaft 162 by the mechanism hereinbefore described, will cause a corresponding rotation of the shaft 134 and brake valve 133 which is mounted thereon.

Figure 15:
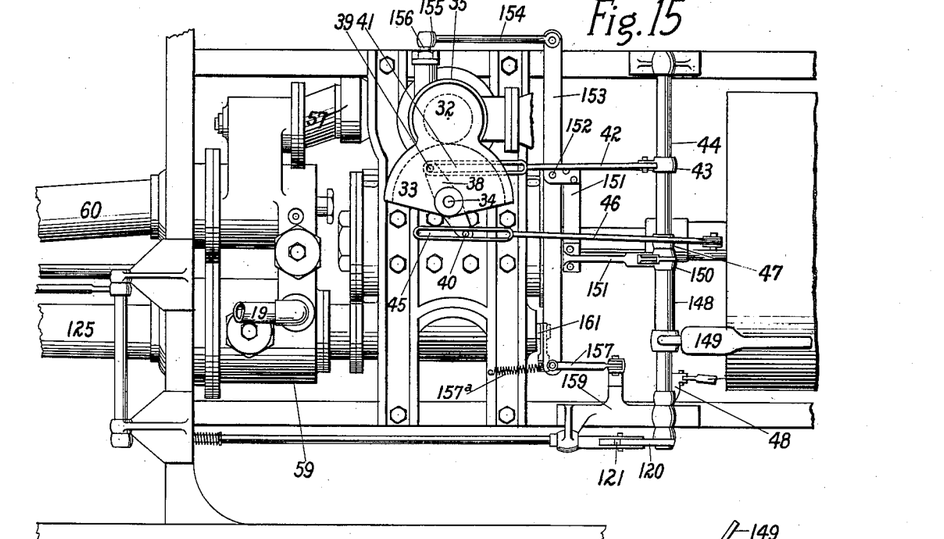
Fig. 15 is a top plan view of a part of the controlling mechanism for my improved transmission mechanism.
Figure 16:
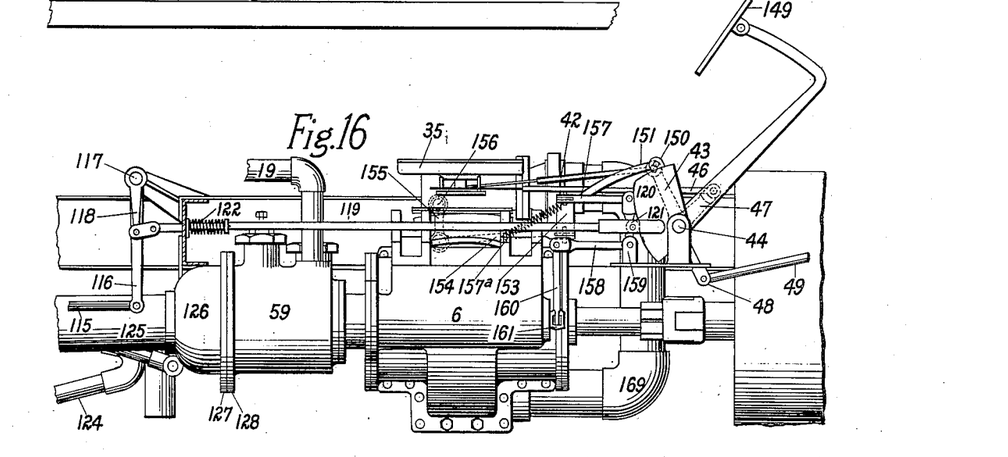
Fig. 16 is a side elevation of the same.

Referring to Figs. 15 and 16, the fulcrum 152 of the lever 153 is so positioned on the said lever, between the links 154 and 157, as to lie nearer the former link than the latter one. Therefore, when the foot-pedal 149 is depressed, the offset link 151, which is connected to the lever 153 at the point 152, will exert a greater pull on the link 154 than on the link 157; and since the link 157 is restrained by the spring 157$^a$, which has an initial tension greater than the reaction caused by the pull of the link 154, the link 154 will move until the rocker arm 155 reaches the limit of its travel. When the rocker arm 155 reaches the limit of its travel, the point of connection of the link 154 with the lever 153, acts as a fulcrum for said lever, and any further movement of the offset link 151 by the foot-pedal 149 will cause the link 157 to move and thus rotate the brake valve 133 through the connecting mechanism previously described. It will now be seen that a partial depression of the foot-pedal 149 will lift the control valve 27 without rotating the brake valve 133, and that a further depression of said foot-pedal 149 ill rotate said brake valve to cover the openings 132 in the chamber 131, either partially or completely. This checks the flow of the fluid from the rear motor, thereby causing said fluid to react on the segments carried by the rotating elements of said motor which are acting as a pump, to retard the motion of the automobile. Before this occurs, however, the control valve 27 is lifted to cut off the supply of motive fluid which is forced into the conduit 57 by the rotary pump. This fluid is now bypassed through the conduit 55 to the inlet chamber 21, which cycle is repeated as long as the engine runs and the valve 27 is in its lifted position.

Figure 4:
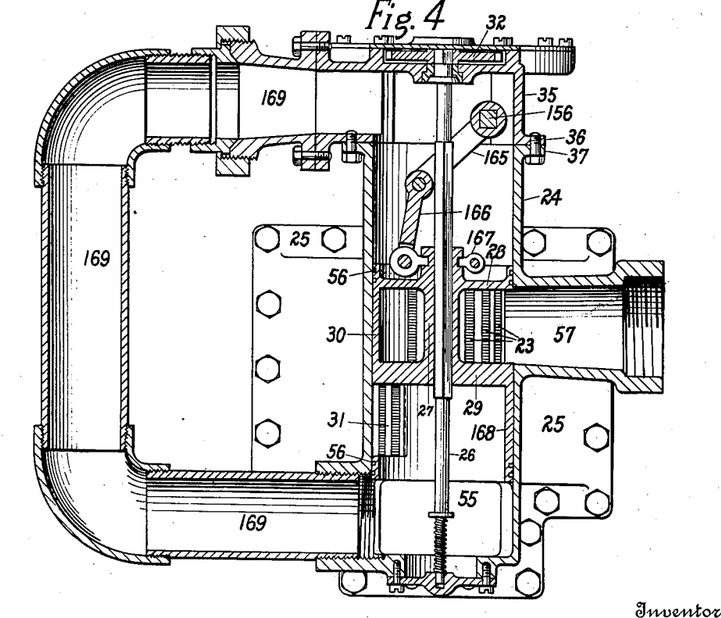
Fig. 4 is a section on the line $a$—$a$ of Fig. 3, showing in detail the clutch and speed control mechanism.

Referring to Fig. 4, the control valve 27 is lifted by the following mechanism: The shaft 156, which enters the gear casing 35, carries a rocker arm 165 which is connected by a link 166 to a swivel collar 167 clamped around the top of the control valve 27. When the shaft 156 is rocked by the mechanism hereinbefore described, the end of the rocker arm 165 will be raised to lift the link 166. The said link 166, being secured to the swivel collar 167, will lift it and also the control valve 27 to which said collar is attached, until the web 29 takes the position normally held by the web 28. The construction of the valve 27 is such that when it is in its raised position, the wall 168 thereof will completely close the conduit 57, irrespective of the position of the retained portion 30 of said valve with reference to the ports 23. The lifting of the control valve 27 at the same time permits the fluid from all the ports 23 to flow under it into the bypass conduit 55 and return thereby to the inlet chamber 21. In order to permit the release of any fluid which may have accumulated above the control valve 27 through leakage, and thereby insure a free vertical movement of the said valve on its shaft 26, a pipe line 169 is provided, which connects the top portion of the valve housing 24 with the bottom portion thereof. Therefore, the accumulated fluid will be bypassed through the pipe line 169 to the bottom of the valve housing 24 when the valve 27 is lifted, and return through said pipe line when the valve is lowered.

The raising and lowering feature of the valve 27 likens it to a driving clutch, which is disengaged to allow the car to drift when applying the brake and also at any other desired time.

When the car is moving and the flow of fluid through the conduit 57 is interrupted due to a change in position of the control valve 27 or stoppage of the rotary pump for any cause, the fluid will continue to be forced from the rear motor through the outlet pipe 112 due to the pumping action of the rotors thereof as previously described. The fluid flowing into the reducing coupling 126 and chamber 130, and then through the chamber 131, cannot pass through the rotary pump. Therefore, it enters the bypass conduit 20 and creates sufficient pressure on the check valve 136 to overcome the tension of the spring 139, allowing the valve to open and the fluid to flow through the pressure chamber 129 and flexible pipe 60, and so return to the rear motor, which cycle may be continuous.

Should the automobile be stopped on a grade and tend to drift in an opposite direction to that in which it was moving, the reverse movement of the rear motor mechanism would cause the fluid to be pumped into the valve casing 61 and back through the flexible pipe 60 to the chamber 129. This flow of the fluid would be stopped, however, by the automatic closing of the check valve 140, and thus stop any backward movement of the car. When the pressure of the fluid in the chamber 129 becomes excessive, due to a too rapid acceleration of speed or any other cause, said pressure is relieved by a safety valve 170, which allows a portion of the fluid to flow into the bypass conduit 20. The safety valve 170 is mounted in a cylindrical guide 171 provided in the casing 59, and is held on its seat 173 by a compression spring 174. Variable tension is placed on this spring 174 by a set screw 175 threaded into a cap 176 on the casing 59. This set screw presses on a circular disk 177 resting on the spring 174 to vary its tension. The safety valve 170 is tubular in form, having its upper portion of larger diameter than its lower portion, to provide a shoulder 178. When the pressure of the fluid is excessive, said pressure will act upon the shoulder 178 to counteract the force of the spring 174, and lift said valve sufficiently to allow the fluid to flow from the chamber 129 into the bypass conduit 20, see Fig. 7. A similar safety valve 179 is mounted between the chamber 130 and 131, so that when the pressure of the fluid in the chamber 130 becomes excessive, due to the action of the brake valve 133, a portion of the fluid will be allowed to flow into the chamber 131 through said safety valve 179.

The operation of my improved hydraulic transmission mechanism may be best explained by employing the following specific examples: For instance, if a certain forward speed is desired, the driver moves the lever 53 counter-clockwise from its neutral or middle position to a position representing the particular forward speed desired. This movement of the said lever will rotate the valve 27, through mechanism hereinbefore described, to cause the retained portion 30 thereof to uncover the upper portions of the number of ports 23 which corresponds to the forward speed selected. The rotary pump will force through these ports a quantity of motive fluid which will drive the rear motor at a speed corresponding to that selected by the lever 53. All the other ports 23 will be open to the opening 31 in the lower half of the valve 27, to be bypassed therethrough, and the conduit 55, to the inlet chamber 21. The fluid pumped into the ports 23, is conducted through the conduit 57, pipe connection 58, valve housing 59 and flexible pipe 60 to the valve casing 61. As a forward speed has been selected by the lever 53, the slide valve 69 of the casing 61 will be actuated, through the mechanism hereinbefore described, to uncover the port 109, and connect the port 111 and outlet pipe 112. Therefore, the fluid forced into the valve casing 61, will be directed by the slide valve 69, into the port 109, which carries said fluid to the middle eccentric bores 98 of the motor casing 65. It here comes in contact with the exposed portions of the segments 94 to drive them, and through them and connecting mechanism, the axle sections 77 and 78. As the driving wheels 3 are mounted on these axle sections, the automobile will be driven in a forward direction at a speed corresponding to that selected by the lever 53. As has been stated, the rate of speed at which the automobile may be driven, may be almost indefinitely proportioned by reason of the fact that the retained portion 30 of the control valve 27 may be so positioned by the lever 53 as to uncover any number or all of the ports 23, or the fractional part of any one. When the segments 94 are returned to their normal positions by the decreasing eccentricity of the bores 98, the fluid escapes through the channels 110 into the outer set of bores 99, where it is received by the segments 96, which act as a pump to force said fluid into the port 111 by which it is carried to the outlet pipe 112. When the lever 53 is moved clockwise from its neutral position, the slide valve 69 will be positioned thereby to uncover the port 111, and connect the port 109 with the outlet pipe 112. Therefore, the two outer sets of segments 96 will be acted upon by the motive fluid to drive the automobile in a reverse direction, and the segments 94 will perform the function of a pump to force said fluid through the port 109 into the outlet pipe 112. The fluid forced into the outlet pipe 112, passes through the flexible pipe 125 and reducing coupling 126 into the cylindrical chamber 130. It then enters the chamber 131 through the openings 132, and flows from it into the inlet chamber 21. If it is desired to allow the automobile to drift or coast, the foot-pedal 149 is depressed sufficiently to lift the control valve 27 from its normal position, through the mechanism hereinbefore described, to close the conduit 57 and thus obstruct the flow of motive fluid to the motor. And in order to retard the movement of the automobile, the foot-pedal 149 is further depressed, which will cause the brake valve 133 to be rotated to partially or completely close the openings 132 in the chamber 131, whereupon the flow of the fluid will be correspondingly checked to oppose the rotation of the driving elements of the rear motor.

It is now evident that the advantages of my improved hydraulic transmission mechanism are manifold. Almost any number of speeds, both forward and reverse, may be readily obtained. An effective differential and braking construction is provided for, as well as many other incidental and important advantages which have hereinbefore been brought out.

I do not wish to be limited to the details of construction and arrangement herein shown and described, but the character of the means employed may be varied to suit different conditions of use.

Having described my invention, I claim:

1. A hydraulic transmission mechanism comprising in combination a rotary pump, a prime mover for driving the same, a hydraulic motor, a casing for said pump, a cylindrical valve chamber communicating with said pump casing, fluid passages connecting said chamber and motor, and a valve mounted in said chamber, said valve having a rotary and longitudinal movement to control the flow of motive fluid to the motor, substantially as described.

2. A hydraulic transmission mechanism comprising in combination a rotary pump, a prime mover for driving the same, a hydraulic motor, a casing for said pump, a cylindrical valve chamber communicating with said pump casing, fluid passages connecting said cylindrical chamber and motor, a rotary valve mounted in said cylindrical chamber, manually-controlled means for rotating said valve to proportion the amount of motive fluid delivered to the motor, and foot-controlled means for imparting longitudinal movement to said valve to completely cut off the flow of motive fluid to the motor, substantially as described.

3. In a hydraulic transmission mechanism for automobiles, a rotary pump, a prime mover for driving the same, a hydraulic motor, a casing for said pump, a cylindrical valve chamber communicating with said pump casing, a plurality of ports provided in said cylindrical chamber communicating with a corresponding number of ports in the pump casing, and a valve capable of both rotary and longitudinal movement, mounted in said cylindrical chamber, said valve adapted to be rotated to uncover any number of said ports to permit the flow of motive fluid therethrough to the motor, and adapted to be moved longitudinally to cut off completely said flow, substantially as described.

4. A hydraulic transmission mechanism for automobiles, comprising in combination a rotary pump, a prime mover for driving the same, a hydraulic motor, a casing for said pump, a cylindrical valve chamber communicating with said pump casing, a plurality of ports provided in said cylindrical chamber communicating with a corresponding number of ports provided in the pump casing, and a cylindrical valve divided into two compartments, mounted in said chamber, the cylindrical wall of the upper valve compartment being sufficiently cut away to provide a retained portion which normally covers the upper portions of the ports in the cylindrical chamber, and the cylindrical wall of the lower valve compartment being sufficiently cut away to provide an opening therein which communicates with the lower portions of said ports, said valve, when rotated, being adapted to uncover the upper portions of all, any number, or the fractional part of one of said ports to permit the flow of motive fluid therethrough to the motor, at the same time bringing the opening in the lower compartment thereof into a position to receive motive fluid from all the ports except those uncovered by the upper portion of the valve, to bypass the motive fluid therethrough, substantially as described.

5. In a hydraulic transmission mechanism for automobiles, a hydraulic motor, induction and eduction fluid passages connected thereto, a longitudinally movable speed control valve mounted in the induction passage and adapted to admit motive fluid thereto, a brake valve located in the eduction passage and adapted to be rotated to oppose the flow of motive fluid from the motor, linkage adapted to actuate each valve successively, and a foot-controlled member in operative connection with said linkage, said foot-controlled member, when first actuated, being adapted to bring the linkage in operative relation with the speed control valve to shift said valve and thereby cut off the supply of motive fluid to the motor, and also being adapted, when further actuated, to bring the linkage in operative relation with the brake valve and thereby rotate said valve to check the flow of motive fluid through the eduction passage, to oppose the rotation of the motor, substantially as described.

6. In a hydraulic transmission mechanism for automobiles, a hydraulic motor, induction and eduction fluid passages connected thereto, a longitudinally movable control valve mounted in the induction passage and adapted to admit motive fluid thereto, a brake valve located in the eduction passage and adapted to be rotated to oppose the flow of motive fluid from the motor, operating mechanism for each valve, linkage adapted to actuate each valve-operating mechanism successively, and a foot-controlled lever in operative connection with said linkage, said foot-controlled lever, when first depressed, being adapted to bring the linkage in operative relation with the control-valve operating mechanism to shift said valve and thereby cut off the supply of motive fluid to the motor, and also being adapted, when further depressed, to bring the linkage in operative relation with the brake-valve operating mechanism and thereby rotate said valve to check the flow of motive fluid through the eduction passage, to oppose the rotation of the motor, substantially as described.

7. In a hydraulic transmission mechanism, a rotary pump mechanism, a prime mover for rotating the same, a casing for said pump mechanism, a hydraulic motor, fluid passages connecting said motor and pump casing, a plurality of eccentric bores provided in said pump casing, end rings carried by the pump mechanism, a plurality of circular supporting plates located between said rings, rotating spiders secured to the said rings and plates, one spider for each eccentric bore, and a plurality of semi-circular recesses formed in the periphery of each spider and adapted to receive a like number of oscillating segments, said segments adapted to oscillate in their respective recesses about pivots carried by the plates and end rings, whereby, when said pump mechanism is rotated, each segment, through centrifugal force, will be so moved as to present a portion of its surface for continuous engagement with its respective bore, to trap the motive fluid and impart to it sufficient force to drive the hydraulic motor, substantially as described.

8. In a hydraulic transmission mechanism, a hydraulic motor casing divided into two compartments, an inlet and outlet fluid passage communicating with said compartments, a shaft journaled in each compartment, said shafts being in longitudinal alinement with each other, and rotors carried by each shaft, the rotors of one shaft corresponding to those of the other shaft and being divided into sets, one set adapted to be acted upon by the motive fluid from the inlet passage to rotate the shafts in one direction, while the other set acts as a pump to force said fluid into the outlet passage, substantially as described.

9. In a hydraulic transmission mechanism, a hydraulic motor casing divided into two compartments, an inlet and outlet fluid passage communicating with said compartments, a shaft journaled in each compartment, said shafts being in longitudinal alinement with each other, rotors mounted on each shaft, the rotors of one shaft corresponding to those of the other shaft and being divided into sets, one set adapted to be acted upon by the motive fluid to rotate the shafts in one direction and the other to rotate them in the opposite direction, a plurality of oscillating members movable in each rotor, a plurality of eccentric bores provided in the motor casing, one bore for each rotor, and springs adapted to move the oscillating members into continuous engagement with their respective bores, whereby the oscillating members of one selected set of rotors will be in the path of the motive fluid for a portion of their travel, and will be moved thereby to rotate the shafts, substantially as described.

10. In a hydraulic transmission mechanism, a rotary pump, a prime mover for driving the same, hydraulic motor mechanism, a casing for said mechanism, fluid passages connecting said casing and rotary pump, two sets of eccentric bores provided in said motor casing, a set of oscillating segments movable in each bore, said segments being carried by the motor mechanism, and a spring adapted to move each segment into continuous engagement with its respective bore, the segments movable in one set of bores facing in one direction and those movable in the other set of bores facing in the opposite direction, whereby the segments movable in one set of bores are forced by their springs into the path of the motive fluid to be moved thereby to rotate the motor mechanism, while the segments movable in the other bores will be actuated by their springs to trap the motive fluid which has acted upon the other segments, and force said fluid to the rotary pump, substantially as described.

11. In a hydraulic transmission mechanism for automobiles, a rotary pump, a prime mover for driving the same, a motor casing, fluid passages connecting said pump and motor casing, said motor casing being divided into two compartments, a shaft journaled in each compartment, said shafts being in longitudinal alinement with each other, rotor mechanism carried by each shaft, the rotor mechanism carried by one shaft being similar to that carried by the other, each rotor mechanism being divided into two functionally distinct parts, one part of each mechanism adapted to be acted upon by the motive fluid to rotate the shafts in one direction, and the other part of each mechanism, when acted upon by the motive fluid, being adapted to rotate the shafts in an opposite direction, and a valve adapted to direct the motive fluid to either the forward-driving or reversing parts of said mechanisms, to control the rotatable direction of the shafts, substantially as described.

12. In a hydraulic transmission mechanism for automobiles, a rotary pump, a prime mover for driving the same, a motor casing, a valve housing communicating therewith, fluid passages connecting said valve housing and motor pump, said motor casing being divided into two compartments, a shaft journaled in each compartment, said shafts being in longitudinal alinement with each other, two rotors carried by each shaft, the rotors carried by one shaft being functionally distinct from each other and similar to the rotors carried by the other shaft, two ports provided in said motor casing, each of said ports leading from the valve housing to a rotor on one shaft and a corresponding rotor on the other shaft, and a slide valve mounted in the valve housing and adapted to cover and uncover said ports, the two corresponding rotors which are in communication with one of said ports being adapted to be acted upon by the motive fluid to rotate the shafts in one direction when said port is uncovered by the slide valve, while the other two rotors which are in communication with the other port are adapted to be acted upon by the motive fluid to rotate the shafts in the opposite direction when their respective port is uncovered by said valve, substantially as described.

13. In a hydraulic transmission mechanism for automobiles, a rotary pump, a prime mover for driving the same, a motor casing, a valve housing communicating therewith, fluid passages connecting said valve housing and motor pump, said motor casing being divided into two compartments, a shaft journaled in each compartment, said shafts being in longitudinal alinement with each other, two rotors carried by one of the shafts, each being functionally distinct from the other, similar rotors carried by the other shaft, two ports provided in said motor casing, each of said ports leading from the valve housing to a rotor on one shaft and a corresponding rotor on the other shaft, a slide valve mounted in the valve housing and adapted to cover and uncover said ports, manually-operated means for actuating said valve, an outlet pipe to which one port is connected by the slide valve when the other port is opened thereby, the two corresponding rotors which are in communication with one of said ports being adapted to be acted upon by the motive fluid to rotate the shafts when said port is uncovered by the slide valve, and fluid passages connecting said rotors with the two other rotors, which receive the motive fluid and force it into the port connected with the outlet pipe, substantially as described.

14. In a hydraulic transmission mechanism for automobiles, a motor casing divided into two compartments, a shaft journaled in each compartment, said shafts being in longitudinal alinement with each other and capable of independent movement, rotors mounted on each shaft, the rotors of one shaft corresponding to those of the other shaft and being divided into sets, one set adapted to be acted upon by the motive fluid to rotate the shafts in one direction and the other to rotate them in the opposite direction, a port provided in said motor casing for each set of rotors and adapted to deliver equal quantities of motive fluid to the corresponding rotors of each set, whereby, when the motion of one shaft is retarded and the flow of motive fluid to the selected rotor of that shaft is partially or completely checked, a greater quantity of motive fluid will be delivered to the corresponding rotor of the other shaft to rotate it at a greater rate of speed, substantially as described.

15. In a hydraulic transmission mechanism, a rotary pump, a prime mover for driving the same, a hydraulic motor, a fluid passage connecting said pump and motor, a cylindrical fluid chamber, a fluid passage connecting said chamber and motor, a cylindrical valve chamber mounted within and concentric with said first named chamber, a fluid passage connecting one end of said valve chamber with the rotary pump, openings provided in the other end of said valve chamber whereby it communicates with the chamber within which it is mounted, and a rotary valve mounted within the valve chamber and adapted to partially or completely close said openings to check the flow of motive fluid from the motor and thereby retard its movement, substantially as described.

16. In a hydraulic transmission mechanism, a rotary pump, a prime mover for driving the same, a hydraulic motor, a fluid passage connecting said pump and motor, a cylindrical fluid chamber, a fluid passage connecting said chamber and motor, a cylindrical valve chamber mounted within and concentric with said first named chamber, a fluid passage connecting one end of said valve chamber with the rotary pump, openings provided in the other end of said valve chamber whereby it communicates with the chamber within which it is mounted, a rotary valve mounted within said valve chamber adapted to partially or completely close said openings to check the flow of motive fluid from the motor and thereby retard its movement, a safety valve housing communicating with said cylindrical chamber, and a valve mounted in said housing adapted to be actuated by the motive fluid to relieve the cylindrical chamber of a portion of said fluid when the pressure thereof in said chamber becomes excessive, due to the operation of the rotary valve, substantially as described.

17. In a hydraulic transmission mechanism for automobiles, a rotary pump, a prime mover for driving the same, a hydraulic motor, a valve housing, a fluid passage connecting said housing and pump, and said housing and motor, and a fluid passage connecting said motor and pump for returning fluid from the former to the latter, a valve in said housing, a seat for said valve, and a spring adapted to normally hold said valve on its seat, said valve adapted to be unseated by the motive fluid flowing from the pump to the motor, and again seated by the spring and reaction of the motive fluid caused by a reverse movement of the motor, whereby the back flow of the motive fluid will be checked and the motor stopped, substantially as described.

18. In a hydraulic transmission mechanism for automobiles, a rotary pump, a prime mover for driving the same, a hydraulic motor, a fluid passage connecting said pump and motor for carrying motive fluid from the former to the latter, another fluid passage connecting said pump and motor for returning said fluid from the latter to the former, a valve housing communicating with said first named passage, a conduit connecting said valve housing with the second named fluid passage, a valve mounted in said housing, a seat for said valve, a spring adapted to normally hold said valve on its seat, and a set screw for placing variable tension on said spring, said valve adapted to be raised from its seat by the motive fluid to permit a portion of said fluid to pass from the first named passage to the conduit, when the pressure of said fluid in the said fluid passage overcomes the tension of the valve spring, substantially as described.

In testimony whereof I have hereunto set my hand this 25th day of April, 1912.

WILLIAM DUNN.

Witnesses:
 BYRON B. HARLAN,
 HOWARD S. SMITH.